United States Patent Office 2,824,881
Patented Feb. 25, 1958

2,824,881

PROCESS FOR THE MANUFACTURE OF ANTHRAQUINONE BY OXIDATION OF ANTHRACENE

Walter Wettstein, Kaiseraugst, Switzerland, assignor to Ciba Limited, Basel, Switzerland No Drawing. Original application April 5, 1954, Serial No. 421,160. Divided and this application June 7, 1955, Serial No. 516,800

Claims priority, application Switzerland April 10, 1953

6 Claims. (Cl. 260—385)

Numerous processes are known for the catalytic oxidation of organic compounds. Most of these processes use oxides of vanadium as catalysts either alone, on an inert carrier or in the form of metal vanadates. The best known large scale commercial processes are the oxidation of naphthalene to phthalic anhydride, of benzene to maleic acid and of anthracene to anthraquinone. In the first two of these processes the first stage of the reaction involves additive combination with oxygen followed by the loss of one atom of hydrogen for every oxygen atom additively combined, so that, for example, in the case of naphthalene, naphthoquinone is formed. Immediately after this first stage the oxidized aromatic ring is split up so that the final product contains at most a very small concentration of naphthoquinone and preponderating quantities of phthalic anhydride. In contradistinction thereto, in the case of the oxidation of anthracene the reaction substantially ceases after the absorption of oxygen. Having regard to the close relationship between naphthalene and anthracene it would be expected that also in the case of anthracene subsequent ring splitting would be observed to some extent depending on the activity of the catalyst and the reaction temperatures, concentrations, etc. In fact a commercial catalyst used for the oxidation of naphthalene, and consisting of vanadium pentoxide on silica gel and potassium sulfate, when used at 350–370° C. leads to the formation of 10–20 percent of phthalic anhydride in addition to anthraquinone, which naturally reduces the yield of anthraquinone to a considerable extent. It has indeed been proposed in German Patent No. 349,098, first patent of addition to German Patent No. 347,610, to use in the aforesaid reaction a substantially milder catalyst than that described in the parent patent, that is to say heavy metal vanadates instead of vanadium pentoxide. As examples there are mentioned copper vanadate and silver vanadate. Furthermore, the use of ferric vanadate is also known for the reaction in question (Fiat Final Report No. 1313, P. B. 85172, page 332). With these catalysts yields amounting to about 92–95 percent of the theoretical yield are obtained according to P. B. 7381, volume II, pages 4927–4936. Similar results can be obtained by mixing a vanadium pentoxide catalyst on an inert carrier, such as kieselguhr, aluminum hydroxide, pumice, etc., with a quantity of a strongly alkaline oxide such, for example, as potassium hydroxide or magnesium oxide, insufficient to form a meta-vanadate. In this manner ring splitting, that is to say the formation of phthalic acid, is almost completely suppressed. A process for making and using such alkaline vanadium catalysts is described in U. S. patent application Serial No. 421,159, filed April 5, 1954.

The present invention is based on the observation that catalysts of the above kind, that is to say both heavy metal vanadates and also alkali-treated vanadium pentoxide catalysts, after prolonged use begin to promote the formation of phthalic acid and reduce the yield of anthraquinone, and at the same time the formation of carbon dioxide by total combustion increased. This phenomenon is due to the fact that sulfur-containing impurities in the starting materials give rise under the conditions of catalysis to the formation of strongly acid compounds which remain in the catalytic mass. In this manner the active alkaline addition is neutralized or vanadic acid is liberated from heavy metal vanadates. It has been found that the poisoning of the catalyst can be eliminated by neutralizing the strongly acid compounds.

Accordingly, this invention provides a process for keeping constant or regenerating the activity of oxidation catalysts, the activity of which is impaired by acid compounds, which are formed during the use of the catalyst and remain in the catalytic mass, which process is characterized by neutralizing these acid compounds. The process is especially suitable for regenerating or keeping constant the activity of the vanadium catalysts mentioned above, which are used for the manufacture of anthraquinone or anthracene. The catalytic mass no longer possessing the desired catalytic action is removed from the synthesis apparatus and treated with an appropriate quantity of an alkaline compound. For this purpose there are suitable, for example, alkali metal hydroxides, alkali metal carbonates, alkaline earth metal hydroxides, alkaline earth metal carbonates, or a solution of an alkali alcoholate, such as potassium methylate. After the neutralization, and, if desired, after removing harmful compounds which have accumulated, which may be carried out by washing or sublimation, depending on the nature of the compounds, the catalytic mass is finished in the usual manner and charged into the apparatus.

While the activity of the catalyst can be maintained for several months, say 3 or 4, it begins to decrease noticeably after that. Regeneration of the catalyst with caustic alkali is then advisable. The time when such regeneration should be carried out depends on the yield that is desired.

The following examples illustrate the invention, the parts being by weight unless otherwise stated, and the relationship of parts by weight to parts by volume being the same as that of the kilogram to the liter:

*Example 1*

940 parts of potassium carbonate of 95 percent strength are ground in a ball mill for 4 hours with 2340 parts of ammonium meta-vanadate and 2500 parts of commercial aluminum hydroxide calcined at 500° C. Then 600 parts of commercial potassium sulfate and 400 parts of graphite are added, and the whole is stirred for 16 hours. The powder is then slightly moistened with 300 parts by volume of methanol, 50 parts by volume of water and 20 parts by volume of glycerine, the mixture is compressed into cylindrical pellets 7 mm. in diameter and 7 mm. long, and the pellets are roasted in a current of air for 2 hours at 500° C. and one hour at 590° C.

The pellets are charged into a contact furnace and a current of air containing 11–12 grams of anthracene per cubic meter is passed through the catalyst at the rate of 1.8 cubic meters per hour per liter of space occupied by the catalyst at 360° C. Anthraquinone is obtained in a yield amounting to 93 percent of the theoretical yield calculated on the anthracene introduced. Phthalic acid can be detected only in traces in the final product. In the course of three months the yield gradually diminishes until it amounts to about 80 percent of the theoretical yield, and at the same time the formation of phthalic anhydride increases until it amounts to about 5 percent on the weight of the anthraquinone obtained.

The catalyst described above, which has been impaired by operating for two months, is regenerated as follows:

10.800 parts of the used catalyst are ground with 600 parts of potassium carbonate of 95 percent strength and 350 parts of graphite for 20 hours in a ball mill, then moistened with 300 parts by volume of methanol, 50 parts by volume of water and 2 parts by volume of glycerine, compressed in a pelleting press to form cylindrical pellets 7 mm. in diameter and 7 mm. long, and the pellets are roasted in a current of air at 480–540° C. The catalyst so treated possesses the properties of the fresh catalyst.

*Example 2*

The catalyst described in Example 1, which had been impaired by operation for two months, is regenerated as follows:

97 parts of the used catalyst are impregnated with a solution of 4.3 parts of potassium hydroxide of 86 percent strength in 40 parts of methanol, and allowed to stand for 16 hours. The methanol, which contains only traces of potassium hydroxide, is then drained off, adherent methanol is removed from the catalyst pellets by distillation, and the pellets are roasted at 500–540° C. in a current of air.

The catalyst so treated possesses the properties of the fresh catalyst.

This application is a division of copending application Serial No. 421,160, filed April 5, 1954.

What is claimed is:

1. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass.

2. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass by adding to said mass an alkali metal hydroxide.

3. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass by adding to said mass an alkali metal carbonate.

4. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass by adding to said mass an alkali metal alcoholate.

5. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass by adding to said mass an alkaline earth metal hydroxide.

6. In the process for the manufacture of anthraquinone by oxidation of anthracene with an oxygen-containing gas in the presence of a vanadium catalyst, the improvement which comprises regenerating and keeping constant the catalytic activity of said catalyst by neutralizing acid compounds which are formed during the use of the catalyst and remain in the catalytic mass by adding to said mass an alkaline earth metal carbonate.

References Cited in the file of this patent

UNITED STATES PATENTS

| 1,880,322 | Jaeger | Oct. 4, 1932 |
| 1,896,031 | Reynolds | Jan. 31, 1933 |
| 2,081,272 | Foster | May 25, 1937 |